(12) United States Patent
Lofthus

(10) Patent No.: US 10,185,976 B2
(45) Date of Patent: Jan. 22, 2019

(54) SHOPPING SYSTEMS, USER INTERFACES AND METHODS

(71) Applicant: TARGET BRANDS INC., Minneapolis, MN (US)

(72) Inventor: Mark Lofthus, St. Paul, MN (US)

(73) Assignee: Target Brands Inc., Minneapolis, MN (US)

( * ) Notice: Subject to any disclaimer, the term of this patent is extended or adjusted under 35 U.S.C. 154(b) by 553 days.

(21) Appl. No.: 14/755,701

(22) Filed: Jun. 30, 2015

(65) Prior Publication Data

US 2016/0027059 A1    Jan. 28, 2016

Related U.S. Application Data

(60) Provisional application No. 62/027,872, filed on Jul. 23, 2014.

(51) Int. Cl.
*G06Q 30/02* (2012.01)

(52) U.S. Cl.
CPC ..... *G06Q 30/0267* (2013.01); *G06Q 30/0241* (2013.01)

(58) Field of Classification Search
CPC ....................................... G06Q 30/02–30/0277
See application file for complete search history.

(56) References Cited

U.S. PATENT DOCUMENTS

| | | |
|---|---|---|
| 8,069,081 B2 | 11/2011 | Neufeld et al. |
| 8,098,881 B2 | 1/2012 | Camp et al. |
| 8,208,764 B2 | 6/2012 | Guckenberger |
| 8,326,031 B2 | 12/2012 | Boncyk et al. |
| 8,412,687 B1 | 4/2013 | Ruzon et al. |
| 8,582,817 B2 | 11/2013 | Boncyk et al. |
| 8,588,527 B2 | 11/2013 | Boncyk et al. |

(Continued)

FOREIGN PATENT DOCUMENTS

| | | | | |
|---|---|---|---|---|
| WO | WO 2007/130688 A2 | * | 11/2007 | ............... G06T 7/20 |
| WO | 2013079098 | | 6/2013 | |

OTHER PUBLICATIONS

Perez, Sarah."Pounce, The App That Helps Shoppers Find Items Using Image Recognition, Is Now a Deals Browser, Too." Tech Crunch, Nov. 12, 2013,[online], [retrieved on Dec. 10, 2017]. <URL: https://techcrunch.com/2013/11/12/pounce-the-app-that-helps-shoppers-find-items-using-image-recognition-is-now-a-deals-browser-too/>.*

(Continued)

*Primary Examiner* — Michael W Schmucker
*Assistant Examiner* — Bion A Shelden
(74) *Attorney, Agent, or Firm* — Hamre, Schumann, Mueller & Larson, P.C.

(57) ABSTRACT

Shopping systems, user interfaces, and methods that provide a user a way to quickly and seamlessly shop and purchase from an advertisement at the moment of discovery of the product(s) within the advertisement. A user can use a mobile device to scan the advertisement using an application that resides on the mobile device. The advertisement is then recognized to determine recognized products appearing in the advertisement. A list of products from the recognized products is then displayed on the display screen of the mobile device to enable the user to shop and, if desired, purchase one or more of the products.

17 Claims, 13 Drawing Sheets

(56) References Cited

U.S. PATENT DOCUMENTS

| | | | |
|---|---|---|---|
| 8,782,077 B1* | 7/2014 | Rowley | G06F 17/30864 707/769 |
| 2006/0240862 A1 | 10/2006 | Neven | |
| 2008/0228599 A1* | 9/2008 | Webb | G06Q 30/0603 705/26.41 |
| 2008/0279481 A1 | 11/2008 | Ando | |
| 2010/0026721 A1* | 2/2010 | Park | G06F 3/0481 345/660 |
| 2010/0045816 A1* | 2/2010 | Rhoads | G06K 9/228 348/222.1 |
| 2010/0283743 A1* | 11/2010 | Coddington | G06F 3/0485 345/173 |
| 2011/0145068 A1* | 6/2011 | King | G06F 17/211 705/14.55 |
| 2011/0270697 A1* | 11/2011 | Sunkada | G06F 17/30247 705/26.1 |
| 2012/0004958 A1* | 1/2012 | Bloom | G06Q 30/0241 705/14.4 |
| 2012/0062596 A1* | 3/2012 | Bedi | G06Q 30/0256 345/633 |
| 2012/0232993 A1* | 9/2012 | Calman | G06Q 30/02 705/14.58 |
| 2013/0021374 A1* | 1/2013 | Miao | G06F 3/011 345/633 |
| 2013/0247159 A1 | 9/2013 | Hall et al. | |
| 2013/0282532 A1 | 10/2013 | Shihadah et al. | |
| 2014/0040043 A1 | 2/2014 | Barron et al. | |
| 2014/0074621 A1 | 3/2014 | Chai et al. | |
| 2014/0089097 A1* | 3/2014 | Byun | G06Q 30/0267 705/14.64 |
| 2014/0108146 A1 | 4/2014 | Rathus et al. | |
| 2014/0152847 A1* | 6/2014 | Zomet | G06Q 30/0629 348/207.1 |
| 2014/0266988 A1* | 9/2014 | Fisher | G02B 27/017 345/8 |
| 2014/0337174 A1* | 11/2014 | Lin | G06Q 30/0623 705/26.61 |
| 2015/0170245 A1* | 6/2015 | Scoglio | G06Q 30/0623 705/14.55 |
| 2016/0125252 A1* | 5/2016 | Harada | G06K 9/50 382/103 |

OTHER PUBLICATIONS

Macy's. "Macys Star Gifts: Scan direct mail to shop 230 must-have gifts and watch 83 promotional videos". Available at Apple App Store; Available at least as of Jan. 21, 2014. [Cited by applicant in Nov. 21, 2015 IDS].*

"Digimarc: Image & Audio Recognition for direct mail and music"; by Digimarc Corporation, available at Apple App Store; available at least as of Jan. 21, 2014 (1 page).

"Macys Star Gifts: Scan direct mail to shop 230 must-have gifts and watch 83 promotional videos"; by Macy's, available at Apple App Store; available at least as of Jan. 21, 2014 (2 pages).

"Pounce: Scan and shop paper circulars and catalogs from Target, Macy's, Staples, and Toys "R"Us"; by BuyCode Inc., available at Apple App Store; available at least as of Jan. 21, 2014 (3 pages).

"Flow Powered by Amazon" by A9 Innovations, LLC; available at Apple App Store; available at least as of Sep. 19, 2013 (1 page).

"The Layar App"; by Layar B.V. found online at www.layar.com/products/app/; printed May 6, 2014, available at least as of 2013 (6 pages).

"The Metaio SDK: Online Apps with Metaio Cloud Licensing," found online at www.metaio.com, printed Jun. 30, 2015, available at least as of Jun. 2014 (2 pages).

"Scan—QR Code and Barcode Reader," by QR Code City; available at Apple App Store, at least as of Oct. 9, 2013 (1 page).

"House Beautiful Connect" by Hearst Communications, Inc.; available at Apple App Store, at least as of Mar. 24, 2012 (1 page).

"LoveList for Pinterest—scan to pin what you love" by Studio Tentpole, LLC; available at Apple App Store, at least as of Jan. 27, 2014 (1 page).

"Walmart Scan & Go," found online at walmart.com, at least as of Feb. 19, 2014 (1 page).

"Shop Scan Save" by Mobilize Systems Ltd; available at Apple App Store, at least as of Aug. 5, 2013 (1 page).

"Quick Scan—Barcode Scanner & Best Shopping Companion," by iHandy Inc.—available at Apple App Store, at least as of Dec. 19, 2013 (1 page).

"Shot & Shop—visual search to find Fashion while taking Photos," by Shot & Shop, SL; available at Apple App Store, at least as of Feb. 19, 2014, printed on Oct. 5, 2015 (3 pages).

"ScanLife," by Scanbuy; found online at http://www.scanlife.com/get-the-app; available at least as of Feb. 19, 2014 (1 page).

"ShopSavvy Classic (Barcode Scanner and QR Code Reader)," by ShopSavvy, Inc.; available at the Apple App Store, at least as of Jan. 22, 2014 (1 page).

"Stop & Shop SCAN IT!," by Modiv Media, Inc., available at the Apple App Store, at least as of Dec. 18, 2013 (1 page).

"ShopWell—Healthy Diet & Grocery Food Scanner," by YottaMark, Inc., available at the Apple App Store, at least as of Jan. 16, 2014 (1 page).

"Seventeen Shopping Insider," by Hearst Communications, Inc.; available at the Apple App Store, at least as of Dec. 19, 2013.

"Barclays Pingit," by Barclays Bank PLC; available at the Apple App Store, at least as of Dec. 9, 2013 (1 page).

"Style Scan," by Karl Pierre; available at the Apple App Store, at least as of Jan. 13, 2014 (1 page).

"Rediff Shopping," by Rediff.com; available at the Apple App Store, at least as of Nov. 15, 2013 (1 page).

"Blippar," by blippar.com; available at the Apple App Store, at least as of 2011 (4 pages).

"Quirky," found online at www.quirky.com; available at least as of Jan. 30, 2014 (1 page).

* cited by examiner

PRODUCT LIST

CAPTURE IMAGE

SHOPPING SYSTEMS, USER INTERFACES AND METHODS

BACKGROUND

Shopping is no longer tied to a physical space. In an on-demand world, consumers now have access to a wider array of information, products, and services than ever before. This creates a consumer expectation that she can get what she wants, when she wants it, and how she wants it. In the case of advertisements of products, a gap exists between the moment a consumer sees a product within the advertisement and her ability to buy the product.

SUMMARY

Shopping systems, user interfaces, and methods are described herein that provide a user a way to quickly and seamlessly shop and purchase from an advertisement at or near the moment of discovery of the product(s) displayed within the advertisement. The advertisement can be any type of advertisement that advertises products including, but not limited to, printed advertisements appearing in newspapers, catalogs, magazines, circulars, mailers, etc., in-store advertisements, and non-printed advertisements such as on-line advertisements, and the like.

In one embodiment, the advertisement is imaged using a camera on a mobile device and compared to one or more advertisements stored in memory. Once the advertisement is identified, a list of recognized products included in the advertisement is generated. The list of recognized products can then be displayed to the user to permit the user to shop the recognized products. Any techniques for imaging the advertisement and comparing the advertisement with the stored advertisements can be used. In one embodiment, image recognition can be used to perform the comparison.

In one embodiment, a user can use a mobile device to capture an image of the advertisement using an application that resides on the user's mobile device. The captured image is compared to advertisements stored in memory to identify the advertisement. A list of products from the recognized advertisement is then generated and displayed in a user interface on the display screen of the user's mobile device to enable the user to shop those products and, if desired, purchase one or more of the products. The list of products is displayed without the user having to first view video, promotional advertising, or other material extraneous to the recognized products. Immediately displaying the list without requiring the user to navigate through one or more videos, promotional advertising, or other extraneous materials helps to increase the speed to the user and enhances the shopping experience.

In one embodiment, the advertisement that can be imaged is a designated advertisement for which one or more images of the advertisement are stored in memory for comparison with captured images of the advertisement captured by the camera of the mobile device. The captured images of the advertisement can be captured in a single captured image by the camera or the captured images of the advertisement can be captured in a plurality of captured images by the camera. The designated advertisement can be indicated using one or more suitable indicators on the advertisement that indicate to the user that the advertisement is suitable for imaging and subsequent recognition of the products displayed therein.

In another embodiment, the advertisement can include a visible (i.e. visible to the naked human eye without a magnification device) or non-visible (i.e. not visible to the naked human eye) indicator feature, such as a digital watermark, on the advertisement that is imaged by the mobile device along with the advertisement. The indicator feature can indicate which products appear within the advertisement, as well as indicate which newspaper, catalog, magazine, circular, mailer, etc. the advertisement appears in to facilitate back-end data tracking and analysis. Additional back-end data tracking can include the number of times that an advertisement is imaged, the number of times a product on the list that is displayed to the user has been selected for viewing details of the product, whether a product is purchased, and more.

The image recognition can be achieved by the application on the user's mobile device reaching out to a remote server which stores the advertisement images for comparison with the captured image of the advertisement. In another embodiment, some or all of the stored advertisement images can be stored in memory directly on the mobile device so that the application does not need to reach out to the remote server to achieve the image recognition. This variation would increase the speed of the image recognition but would also require regular updates of the stored advertisement images on the mobile device.

In one embodiment, a list of the products recognized from the advertisement is displayed in the user interface on the display screen of the mobile device in a vertical arrangement, along with a thumbnail image of the product next to each product. No additional taps, clicks, or other user efforts are required in order for the user to view product information.

In another embodiment, a portion of the captured image or the entire captured image from the advertisement also appears at the top of the displayed user interface, with the list of products underneath the captured image.

In another embodiment, an imaging history is generated by the mobile device application that tracks the imaging history of the user. The imaging history can be displayed on the mobile device to permit the user to go back and shop previously imaged advertisements.

In another embodiment, a single button can be displayed in the user interface that a user can select to select all items on the displayed list for purchase. It is to be appreciated that this functionality may be dependent upon the products in the displayed list. For example, this feature may not be available when one or more of the products in the displayed list include options such as size, color, or the like, which require selection before a purchase can be made.

In another embodiment, the application can be configured such that as the mobile device is moved over the advertisement, if the advertisement was recognized, a portion of the advertisement appearing on the display screen (e.g., one or more products within the advertisement) of the mobile device can temporarily pop-up/enlarge on the displayed user interface and then reduce back to regular size as the user moves the mobile device and/or as the portion of the advertisement moves out of the field of view of the camera of the mobile device.

In another embodiment, the application can be configured to allow the user to select either a list option to display a list of all the products or a product-by-product option where the products are displayed one by one.

In still another embodiment, the application can be configured to allow the user the ability to filter the products from the advertisement. When a filter is selected, the entire advertisement can be imaged, but only products in a filter category selected by the user are displayed in the list.

In another embodiment, the user is able to add a product to a virtual shopping cart, and then return to the displayed list to continue shopping and perhaps add one or more additional products to the virtual shopping cart.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Figure 1:
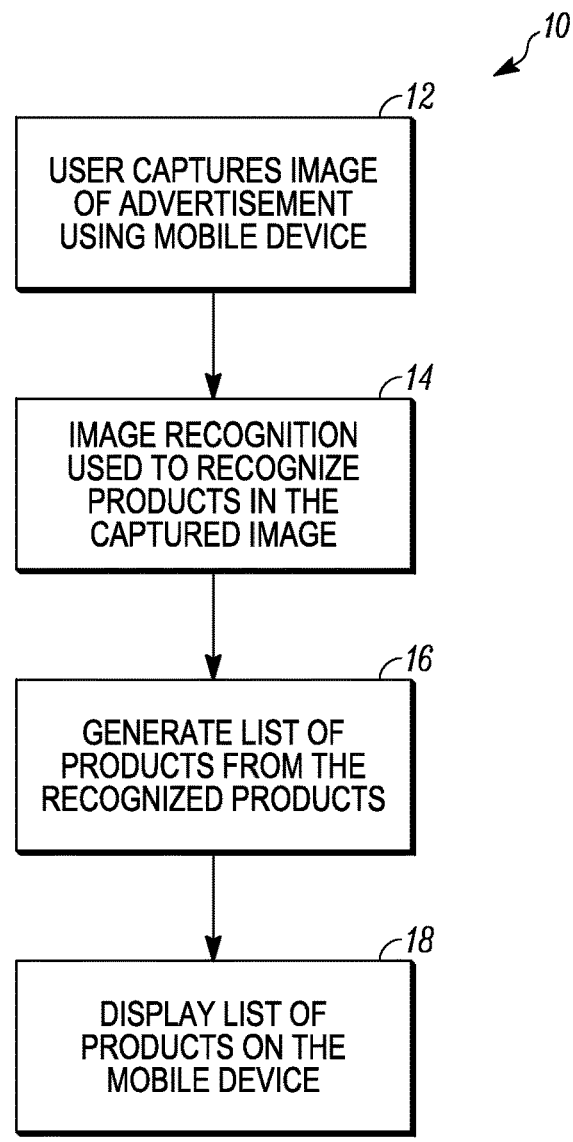
FIG. 1 is a schematic depiction of an image recognition shopping method described herein, according to an embodiment.

Shopping systems, user interfaces and methods are described that provide a consumer a way to quickly and seamlessly shop and purchase from an advertisement at, or shortly after, the moment of discovery of the product(s) within the advertisement. The advertisement is imaged using a camera on a mobile device and compared to advertisement images stored in memory to generate a list of recognized products. The list of recognized products can then be displayed to the user to permit the user to shop the recognized products. Any techniques for imaging the advertisement and comparing the advertisement image(s) with the stored advertisement images can be used. In one embodiment, image recognition can be used to perform the comparison.

As described in further detail below, in one embodiment, a user uses a camera on a mobile device, such as a smartphone or tablet device, to capture an image of the advertisement using an application that resides on the mobile device. The advertisement is then recognized. A list of products from the recognized advertisement resulting from the image recognition is then generated and displayed on the display screen of the mobile device to enable the user to shop the products and, if desired, purchase one or more of the products. The list of products from the recognized advertisement may generally be referred to as recognized products herein.

In one embodiment, the list of products is displayed to the user without the user having to first view video, promotional advertising, or other material extraneous to the products. Immediately displaying the list without requiring the user to navigate through one or more videos, promotional advertising, or other extraneous materials helps to increase the speed to the user and enhances the shopping experience.

The advertisement can be from a retail store or other retailer, from a wholesaler, or from any other entity that offers products for sale. The advertisement can be any type of advertisement that advertises products including, but not limited to, printed advertisements appearing in newspapers, catalogs, magazines, circulars, mailers, and the like, an in-store advertisement, non-printed advertisements appearing on a website, and any other advertisement. In general, the advertisement can be of any type as long as the advertisement can be imaged by a camera on a mobile device to generate a captured image of the advertisement that is of sufficient quality to be able to conduct the image recognition described herein.

The products appearing in the advertisement can be products that are also available for sale within a retail store, for sale on-line such as on a website of a retail store, or that are available for sale via any other sales channel. In one embodiment, some or all of the products in the advertisement need not be for sale. Instead, some or all of the products appearing in the advertisement could be for promotional or other purposes that are intended to permit the user to learn more about the product, but not necessarily to permit the user to be able to purchase the product.

As used herein, a mobile device is any device that can be used to capture an image of an advertisement and that can display the list of recognized products on a display screen that is connected to or associated with the mobile device. Examples of mobile devices include, but are not limited to, mobile phones, smartphones, tablet-style devices, laptop computers, and the like. In one embodiment, the mobile device should include at least a camera and some means to control the camera in order to capture an image of the advertisement as described further below, a display screen and some means to select products that are displayed on the display screen as described further below, and some means to send and receive data communications as described further below.

The cameras on most current mobile devices are capable of capturing photographs and/or video. Thus the captured image can be a photograph or video of the advertisement. In some embodiments, the camera may be capable of capturing an image without the user performing an action (e.g., pressing a shutter button) to cause an image to be taken.

However, any type of image capture technology on a mobile device that is capable of capturing an image of the advertisement can be used.

As used herein, to capture or capturing an image of the advertisement refers to the act of obtaining an image of the advertisement using the camera or other image capture technology of the mobile device. Obtaining the image of the advertisement may also be referred to as imaging the advertisement. A captured image is an image of the advertisement that has been captured by the mobile device. The advertisement from which a captured image has been obtained may be referred to as the imaged advertisement. It is to be appreciated that capturing an image of the advertisement includes capturing an image of the entire advertisement as well as capturing an image of a portion of an advertisement.

As used herein, a recognized product, or a list of recognized products includes those products included in a recognized advertisement. In some embodiments, a recognized product can include those products included in a recognized advertisement and products thematically and/or contextually related to the products included in the recognized advertisement. In one embodiment, the recognized product or list of recognized products can be associated with a particular advertisement. Accordingly, once an advertisement is recognized, all products appearing in the advertisement are recognized.

In modern lexicon, the term scan or scanning using a mobile device is often used to refer to the use of a camera on a mobile device to capture a photograph or video of a barcode or a QR code in an advertisement in order to read the barcode or QR code. Therefore, to capture or capturing the image of the advertisement using a camera of the mobile device may also be referred to using the term scan or scanning the advertisement, and the captured image may also be referred to as a scanned image.

With reference initially to FIG. 1, an embodiment of an image recognition shopping method 10 is illustrated. In the method 10, the user captures an image of an advertisement using the camera function on a mobile device at step 12. Capturing the image is enabled by a mobile device application that has been previously loaded onto the mobile device. The mobile device application permits the user to use the camera of the mobile device to capture an image of the advertisement which includes a plurality of images of products displayed therein to generate a captured image containing the plurality of displayed product images. In one embodiment, the image of the advertisement may only include a single product or even a portion of a product in order to recognize the advertisement. That is, an advertisement can be identified by capturing an image of less than the entire advertisement, according to an embodiment. The advertisement may be divided into quadrants, or other number of defined spaces. In such an embodiment, recognizing the advertisement may be based on recognizing a quadrant, or defined space, of the entire advertisement.

The presence and operation of cameras on mobile devices is ubiquitous. In addition, using a camera on a mobile device to capture images of items such as barcodes and QR codes appearing on advertisement media is well known. Therefore, the technology to permit a camera on a mobile device to be used to capture an image of an advertisement exists and is well known to those of ordinary skill in the art.

Once the advertisement is imaged, the captured image containing the plurality of displayed product images is sent to image recognition technology which is used at step 14 to recognize products within the captured image that appear in the advertisement. In step 14, the image of the advertisement in the captured image is compared to advertisement images that are stored in memory. The image recognition step 14 described herein can use conventional image recognition technology known in the art or any other image recognition technology that permits comparison of advertisement images from the captured image with stored advertisement images to find matches between the images. The products illustrated within the captured image of the advertisement that is determined by the image recognition technology to match with a stored advertisement image are considered to be recognized products.

The method 10 then includes generating a list of the recognized products at step 16 based on the image recognition in step 14. In some embodiments, the list may be predetermined for the advertisement. As indicated above, each recognized product corresponds to one of the displayed product images from the captured image that is determined by the image recognition to match one of the stored advertisement images. Further information on the content and structure of the list of recognized products is described below with respect to FIG. 5. In some embodiments, the list of the recognized products is a predetermined list of recognized products that is retrieved based on the image recognition step 14.

The list of products recognized from the image recognition is then displayed in step 18 on the display screen of the mobile device for shopping and/or purchase by the user. Further information on displaying the list of recognized products is described below with respect to FIG. 5.

Figure 2:
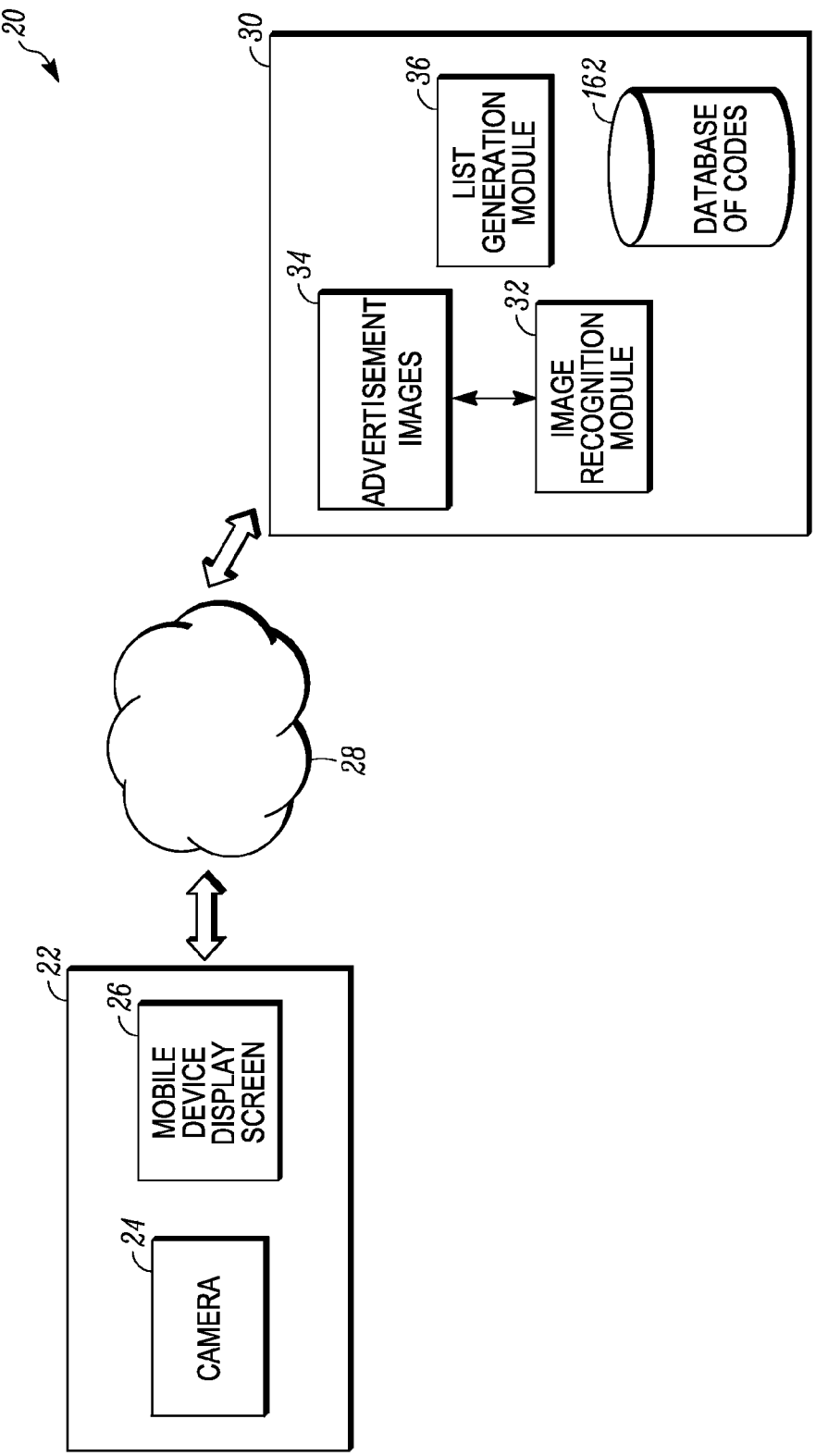
FIG. 2 is a schematic depiction of an image recognition shopping system described herein, according to an embodiment.

With reference to FIG. 2, an embodiment of an image recognition shopping system 20 that can implement the method 10 is illustrated. In this embodiment, the image recognition and list generation occur remote from the mobile device. The illustrated system 20 includes a mobile device 22 that includes at least a conventional camera 24, a conventional display screen 26, and conventional communication means. The communication means of the mobile device 22 permits the mobile device to be in conventional communication via any suitable network 28 such as a cellular network, short message service ("SMS")/text, Wi-Fi, the Internet, and the like, that permits sending of a captured image generated by the camera 24 to a remote server 30.

An application is loaded onto the mobile device 22 that permits the mobile device to capture an image of an advertisement using the camera 24, utilize the existing communication features of the mobile device 22 to communicate with the server 30 to send to the server 30 a captured image of the advertisement and to receive from the server 30 a list of products identified from the image recognition of the advertisement, and to cause the list of products to be displayed on the display screen 26.

The server 30 is configured to include an image recognition module 32 provided with image recognition technology that can receive the captured image sent from the mobile device 22 and that can perform an image recognition process to compare the advertisement in the captured image with stored advertisement images to find matches and thereby determine recognized products. In some embodiments, the recognized products include a predetermined list of products. The server 30 also includes memory 34 that stores a plurality of advertisement images for use in comparing to the advertisement image in the captured image received from the mobile device 22. In one embodiment, the image recognition module 32 can retrieve stored images from the memory 34 to perform the comparison.

The server 30 is also configured to include a list generation module 36 that communicates with the image recognition module 32 and that is configured to generate a list of the products from the recognized advertisement determined by the image recognition. The list of products is then suitably transmitted from the server 30 to the mobile device 22 for display on the display screen 26.

The image recognition module 32, the memory 34, and the list generation module 36 can all reside at the same location, such as on the server 30 (FIG. 2), or one or more of the image recognition module 32, the memory 34, and the list generation module 36 can reside at separate locations, for example, on separate servers.

In addition, the image recognition module 32 and the list generation module 36 can be embodied in hardware, software, firmware, or a combination thereof.

Figure 3:
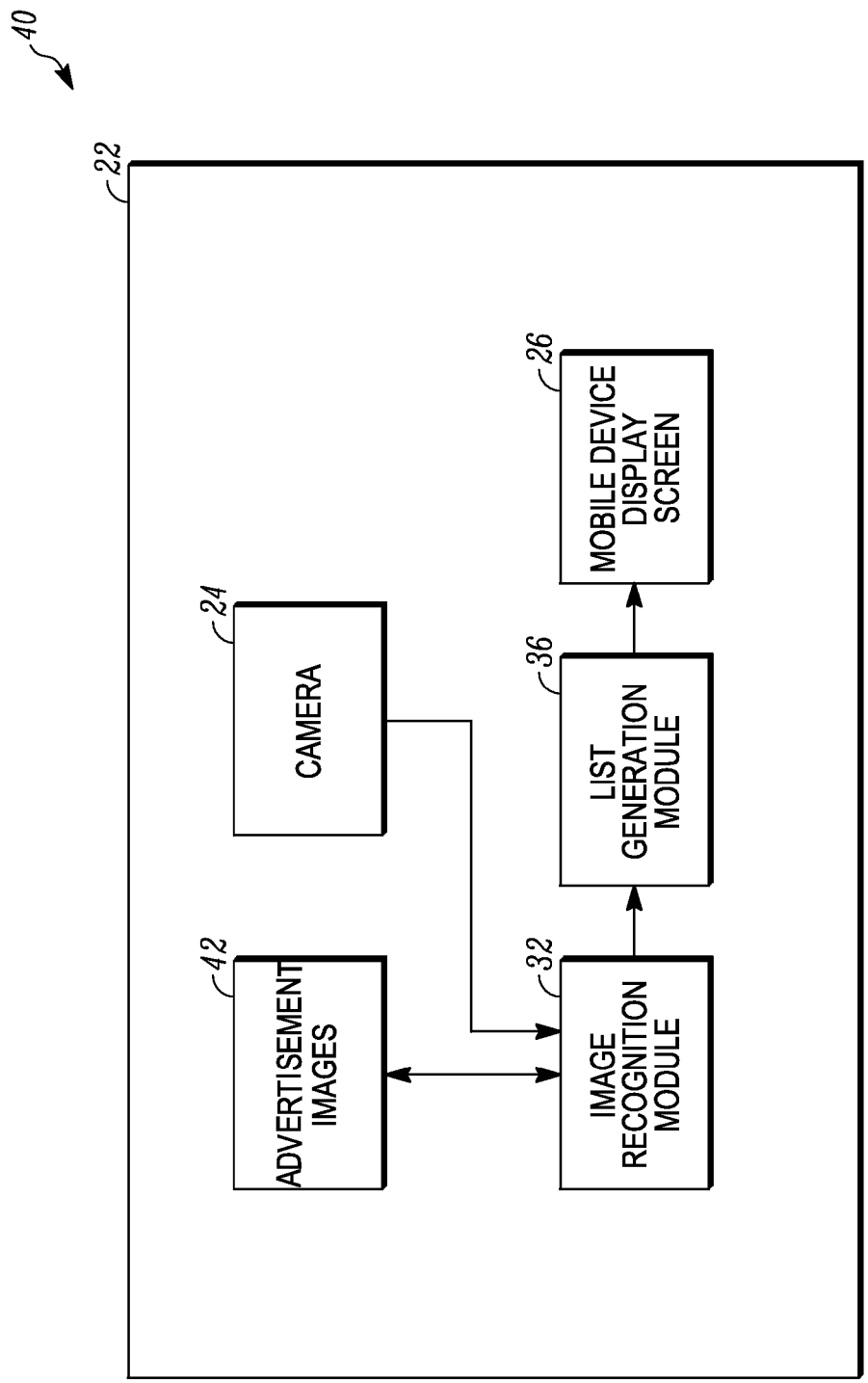
FIG. 3 is a schematic depiction of an image recognition shopping system described herein, according to another embodiment.

An alternative embodiment of an image recognition shopping system 40 is illustrated in FIG. 3. In the system 40, the image recognition and list generation are performed within the mobile device itself so that the mobile device does not need to reach out to an external server to conduct the image recognition and the list generation in order to display the list of recognized products.

The illustrated system 40 includes the mobile device 22 with the camera 24 and the display screen 26. The mobile device 22 also includes the image recognition module 32, memory 42 in which the advertisement images are stored, and the list generation module 36. In addition, an application is loaded onto the mobile device 22 that permits the mobile device to capture an image of an advertisement using the camera 24, send the captured image of the advertisement to the image recognition module 32, receive from the list generation module 36 the list of recognized products, and to display the list of recognized products on the display screen 26.

The system 40 generally produces faster results than the system 20 since the system 40 does not need to transmit a captured image(s) to a remote server, and the list of products does not need to be transmitted back to the mobile device 22. However, because the advertisement images reside in the memory 42 of the mobile device, the application running the system 40 would need to regularly update the stored advertisement images as advertisements change.

In each of the systems 20, 40, the captured image of the advertisement can be sent to the image recognition module as one or more files after the advertisement has been completely imaged. In this case, the image recognition, list generation and sending of the list to the mobile device for display would occur after the capturing of the image of the advertisement takes place.

In another embodiment, data from the capturing of the image can be sent to the image recognition module during capturing of the image of the advertisement. In this embodiment, the image recognition can occur while the capturing of the image of the advertisement is being conducted. One advantage of this embodiment is that it can enable the pop-up enlargement feature discussed below with respect to FIG. 12.

In the systems 20 and 40 described above, at least the camera 24 and the mobile device application permitting capturing of the image by the camera 24 function together to form an image capture means configured to permit capturing an image of an advertisement. In addition, at least the display screen 26 and the mobile device application that causes the list of products to be displayed on the display screen 26 function together to form a display means. Further, at least the image recognition module 32 and the memory 34, 42 that stores the advertisement images used by the image recognition module during comparison function together to form a comparison means in communication with the mobile device 22 and configured to compare the captured image of the advertisement by the mobile device 22 to stored advertisement images in order to determine recognized advertisements and thereby recognized products. Further, at least the list generation module 36 functions to form display file generation means in communication with the comparison means and configured to generate the list of products.

The list of products generated by the list generation module 36 may also be referred to as a display file since the display file determines what is displayed on the display screen 26.

In the systems and methods described herein, the list of products can take many forms and can include varying information. In one embodiment, the list of products can include one or more of the following: images of the recognized products, a brief description of each recognized product, and a price of each recognized product.

In addition, in one embodiment, the list of products can be formatted such that the list is displayed on the display screen 26 in a vertically arranged or vertically stacked list, with the recognized products being displayed vertically one above the other as discussed further below with respect to FIG. 5. As also discussed further below with respect to FIG. 5, the list of products is displayed on the display screen 26 in a visual arrangement that differs from the original visual arrangement of the products in the advertisement.

Further, transmitting the list of products to the mobile device includes, but is not limited to, transmitting the actual list of products, for example the images of the recognized products, the brief description of each recognized product, and/or the price of each recognized product. Alternatively, to reduce the amount of data transmitted, transmitting the list of products can also include transmitting data representative of the list of products, for example pointers that point to one or more suitable storage locations residing on the mobile device 22 or on the server 30 or elsewhere that the mobile device 22 can access in order to obtain the images, the brief description and/or the price.

Figure 5:
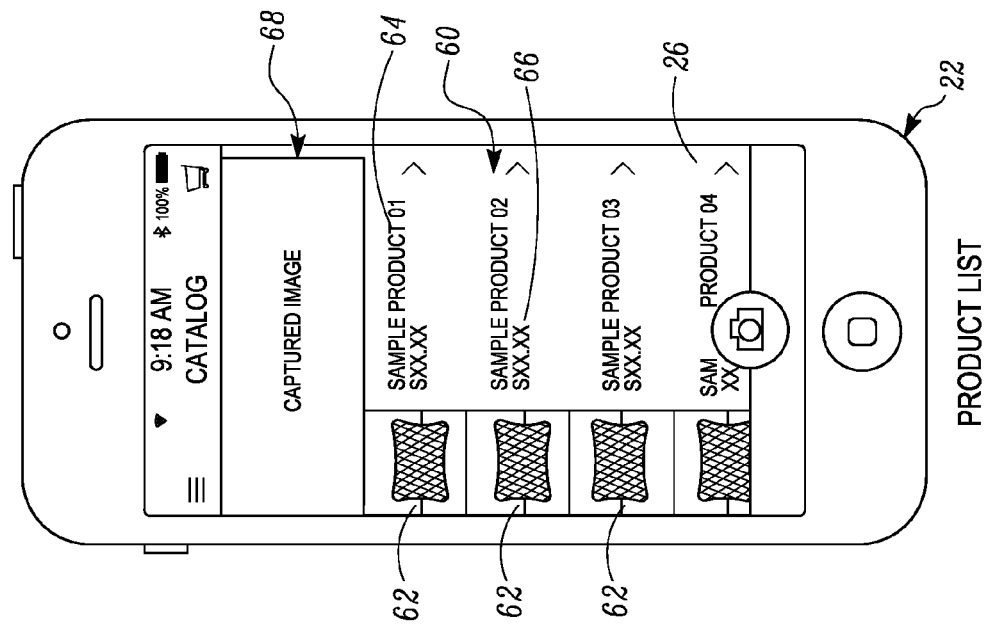
FIG. 5 depicts a screenshot of a display screen on the mobile device displaying a list of the products recognized from the advertisement, according to an embodiment.
Figure 4:
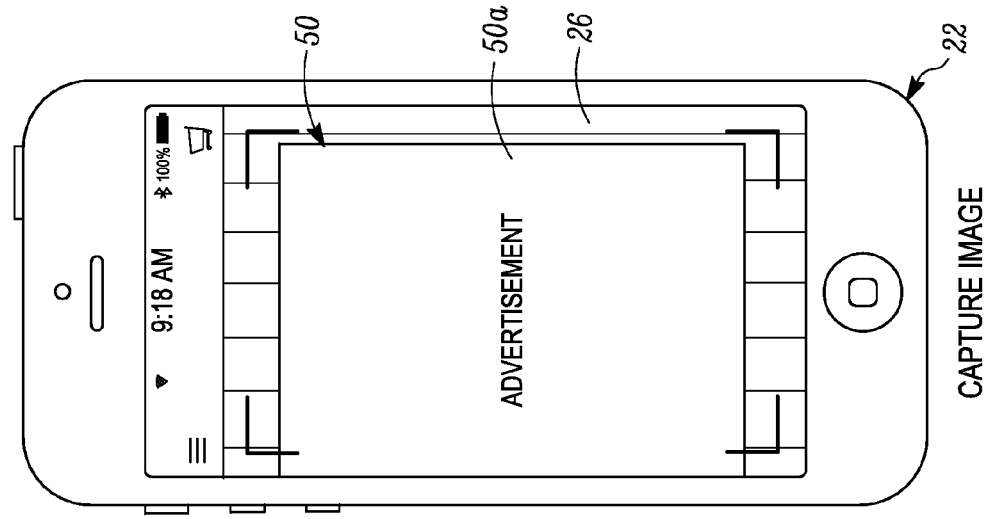
FIG. 4 depicts a screenshot of a display screen on a mobile device while capturing an image of an advertisement, according to an embodiment.
Figure 6:
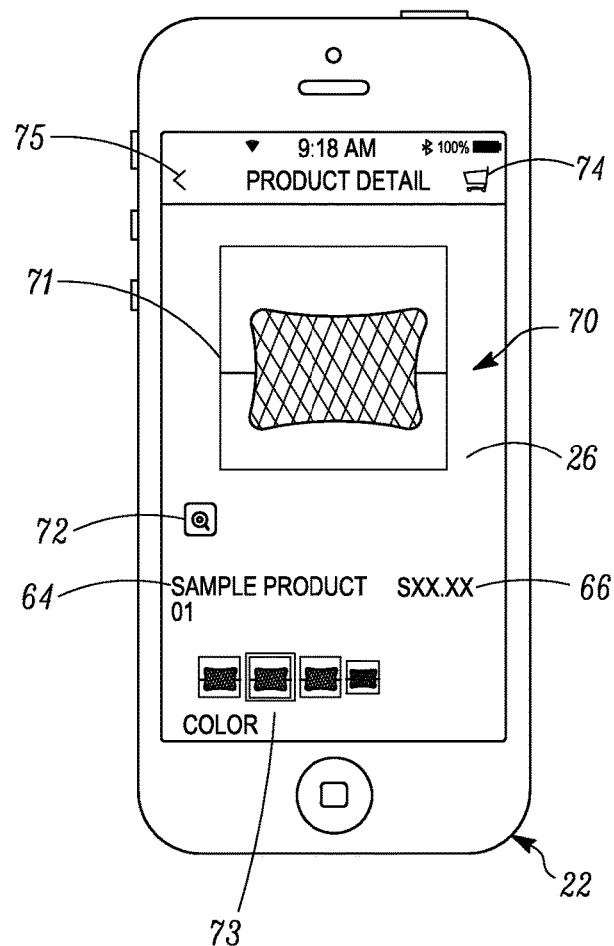
FIG. 6 depicts a screenshot of a display screen on the mobile device displaying a product display page of one of the products selected from the list of products from FIG. 5, according to an embodiment.

Referring now to FIGS. 4-6, screenshots of the display screen 26 on the mobile device 22 are provided showing examples of displayed user interfaces. FIG. 4 shows the user interface as the camera of the mobile device 22 is capturing an image of an advertisement 50. An example of a specific advertisement will be discussed below with respect to FIG. 7.

In the example illustrated in FIG. 4, a portion 50a of the advertisement 50 that is within the field of view of the lens of the camera 24 is displayed on the screen 26 prior to the advertisement being imaged by the camera. If the camera of the mobile device includes zoom capability, the zoom setting of the camera can be adjusted so that more or less of the advertisement can be contained within the field of view of the camera. An image of the portion 50a of the advertisement 50 contained within the field of view is then captured using the camera controls available on the mobile device 22. If the user is interested in products within the advertisement that are not within the current field of view, the user simply moves the camera until more of the advertisement, or the remainder of the advertisement, is within the camera's field of view, and then captures an image of that portion.

The user is therefore able to capture an image of only a portion of the advertisement that may be of interest to the user, in order to obtain a list of those products of interest once the image recognition and list generation is performed.

This helps to minimize presenting products to the user in the list in which the user may not have any interest.

FIG. 5 shows a list 60 of the products displayed on the display screen 26. The list 60 presents those products from the advertisement 50 that were identified (e.g., recognized) from the advertisement in the image recognition step and therefore included in the generated list. In one embodiment, the list 60 of products can be the first displayed results provided on the display screen 26 to the user presenting the results of capturing the image of the advertisement 50 and the image recognition. In this embodiment, there could be one or more "intermediate" display(s) presented to the user on the display screen 26 indicating that the image recognition and/or list generation is occurring. However, in this embodiment, the first display presented to the user on the display screen 26 that provides actual results of the image recognition is the list 60. This is advantageous in that the user is presented immediately with the list 60 of products for shopping and possible purchase. The user does not have to navigate one-by-one through individually displayed products, or navigate through promotional offerings for each product in order to make a purchase.

In this example, the list 60 is arranged as a vertical list with the products in the list visually arranged in a vertically stacked arrangement one above the other. If the vertical length of the list is greater than the vertical size of the display screen 26, the user can use a finger or other suitable scrolling mechanism available on the mobile device 22 to move the list up and down on the display screen 26 in a conventional manner. However, orientations of the list other than vertical are possible, such as a horizontal list.

Also, the products in the list 60 are displayed on the display screen 26 in a visual arrangement that differs from the original arrangement of the products in the advertisement 50. For example, in the advertisement 50, the products can be physically arranged at scattered locations relative to one another such that "sample product 01" from FIG. 5 could be physically located at a lower right corner of the advertisement 50, while "sample product 02" could be located at an upper left corner of the advertisement 50. However, the list 60 rearranges the products into a different physical arrangement relative to one another. So the list 60 is not simply a replication or image of the original advertisement 50.

In the example illustrated in FIG. 5, the list 60 includes information on each product within the list including, but not limited to, a thumbnail image 62 of each recognized product, a brief description 64 of the recognized product such as the product name, and the price 66 of the recognized product. Other information and other combinations of information are possible.

In one embodiment illustrated in FIG. 5, a captured image 68 of the advertisement 50 can also appear at the top of the display screen 26, with the list 60 of products underneath the captured image 68. The captured image 68 can be the same captured image that was used during the image recognition to generate the list of recognized products. The captured image 68 can remain at the top of the screen while the list 60 is scrolled up or down, or the captured image 68 can scroll up and down with the list 60.

If the user is interested in more information on a product in the list 60 and/or is interested in purchasing a product, the user can select the product, for example by using a finger to touch (or hover over) the product of interest in the list or using other input functionality available on the mobile device 22.

FIG. 6 shows an example of a user interface that appears on the screen 26 when the user selects, for example, Sample Product 01 from FIG. 5 for further information. In this example, a more detailed product display page 70 of the Sample Product 01 is displayed providing more detailed information about the Sample Product 01 including, but not limited to, a larger image 71 of the product, the description 64, the price 66, a button 72 that allows the user to see an even larger image of the product, buttons 73 that permit the user to select and display different color options of the product (if applicable), see different size options if applicable (not illustrated), and the like. If the user is interested in purchasing the product, the user can select a cart icon 74 or other available purchase selection option that adds the product to a virtual shopping cart. Virtual shopping carts and adding selected items into a virtual shopping cart are well known in the art. The user can also navigate back to the list 60 shown in FIG. 5 by selecting a back button or icon 75 to continue shopping from the list.

The advertisements that can be imaged can be any advertisement from which images of products appearing within the advertisement can be recognized using image recognition or the like. In one embodiment, the advertisement is a designated advertisement for which images of the advertisement are stored in memory for comparison with one or more captured images taken by the mobile device.

A designated advertisement can be indicated using one or more suitable indicators on the advertisement that indicate to the user that the advertisement is suitable for imaging and subsequent image recognition.

Figure 7:
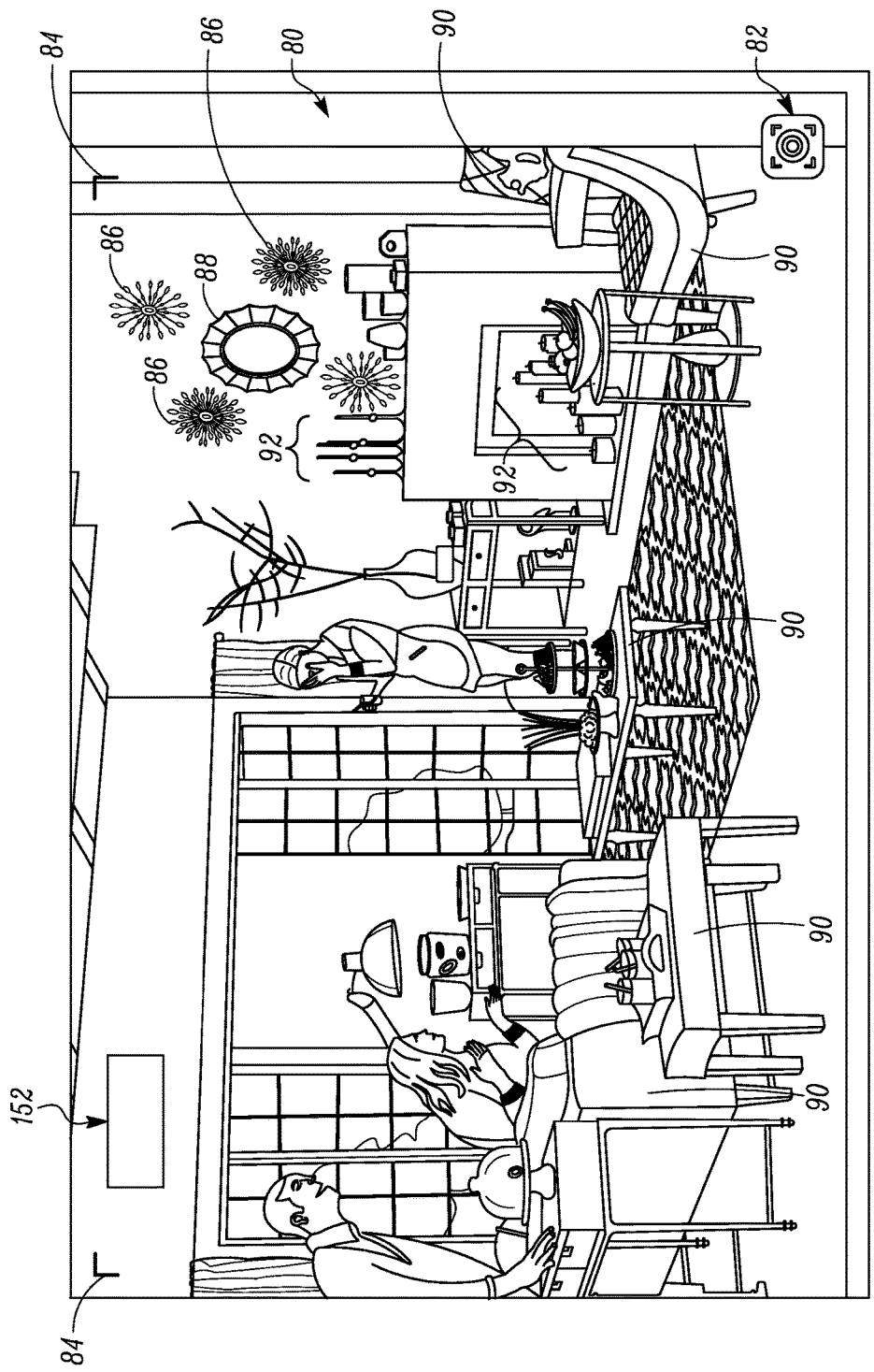
FIG. 7 depicts an advertisement that can be imaged, according to an embodiment.

FIG. 7 illustrates an example of a designated advertisement 80 that can be imaged to generate the list 60 of products. As shown in FIG. 7, an indicator 82 can be located at any suitable location on the advertisement 80 to indicate to a user that the advertisement 80 is suitable from which to capture an image. The advertisement 80 may also include one or more markers 84 that designate the area of the advertisement that can be imaged and recognized.

In the example illustrated in FIG. 7, the advertisement 80 includes images of a plurality of products that are for sale. This example illustrates the products as being home furnishings including, but not limited to, various wall furnishings 86 including a mirror 88, items of furniture 90 including chairs, tables, and the like, accent pieces 92 such as candles and the like, and others. It is to be realized that the advertised products are not limited to home furnishings. Nor do the products displayed in the advertisement need to be part of a similar genre of goods. For example, an advertisement can include clothing items, shoes, cookware, home furnishings, etc.

In another embodiment, the advertisement 80 can include a visible (i.e. visible to the naked human eye without a magnification device) or non-visible (i.e. not visible to the naked human eye) indicator feature, such as a digital watermark, on the advertisement that is imaged by the mobile device along with the images of the products appearing in the advertisement. The indicator feature can indicate which products appear in the advertisement, as well as indicate which newspaper, catalog, magazine, circular, mailer, etc., the advertisement appears in, to facilitate back-end data tracking and analysis. Different advertisements can have different indicator features which allow tracking of how many users capture an image of a particular advertisement. Additional back-end data tracking can include tracking the number of taps on each product (i.e. how many times the product is selected) from the list that is displayed to the user, whether a product is purchased, and more.

Figure 8:
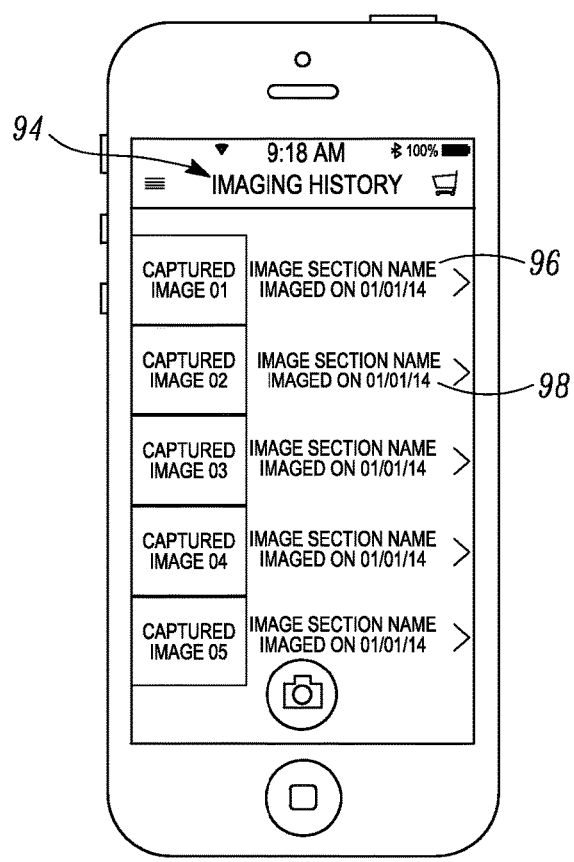
FIG. 8 depicts a screenshot of a display screen on the mobile device displaying an imaging history, according to an embodiment.

FIG. 8 illustrates an embodiment where an imaging history 94 can be retained by the image recognition shopping application and displayed to the user. The imaging history 94 permits the user to go back and shop a previously imaged advertisement. The imaging history 94 can include information on each prior captured image including, but not limited to, a name 96 given to the captured image and a date 98 of the captured image. Selecting one of the saved captured images opens the selected captured image to display the previously generated product list similar to FIG. 5.

In one embodiment, the user can capture an image of the advertisement and then associate the captured image of the advertisement and/or the list 60 with her online account that is created with the retailer or other entity that sponsored the advertisement. This would permit the user to access the captured image and/or the list 60 from the account and shop on her laptop, PC, mobile device, or other device at a later time.

Figure 9:
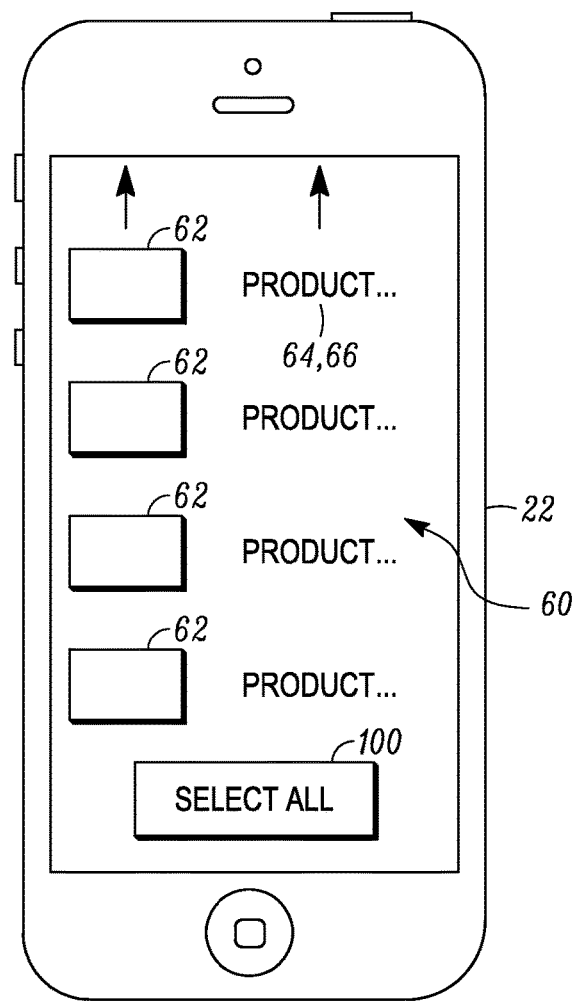
FIG. 9 is a schematic depiction of a screenshot of a display screen on the mobile device showing a "select all" button to permit selection of all products in the list, according to an embodiment.

With reference to FIGS. 5 and 9, an embodiment is illustrated where a user is provided with an option to select all of the products within the list 60 for purchase. A select all option, such as a selectable button 100, can be displayed along with the list 60, for example at the base of the list 60, at the top of the list 60, or at any other suitable location(s) relative to the list, that when selected by the user, selects all of the products in the list 60 for purchase.

Figure 10:
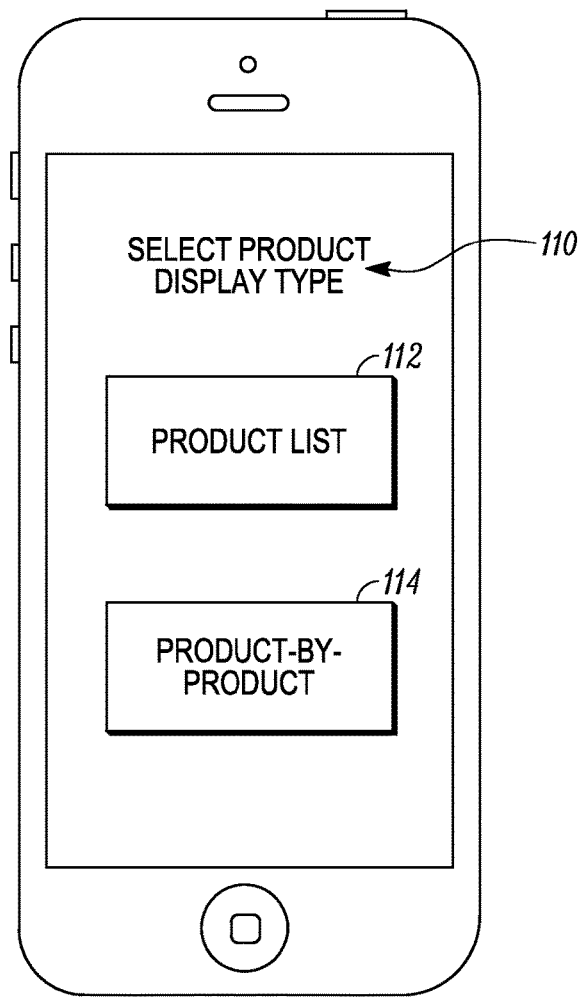
FIG. 10 is a schematic depiction of a screenshot of a display screen on the mobile device showing a product display type selection option, according to an embodiment.

With reference to FIG. 10, another embodiment is illustrated. In this embodiment, either prior to or after capturing the image of the advertisement, the application on the mobile device is configured to present to the user on the display screen the option of selecting a product display type which determines the product display presented to the user on the display screen 26. For example, the user can be prompted to select a product display type 110 such as a product list 112 which, when selected, would result in a display of a list like the list 60 shown in FIG. 5, or a product-by-product display 114, which when selected, would result in display of the recognized products individually rather than in the list 60 so that the user is required to navigate through each product one-by-one to obtain more information on each product and perhaps purchase each product. In another embodiment, the user can switch between the product list display type and the product-by-product display type.

Figure 11:
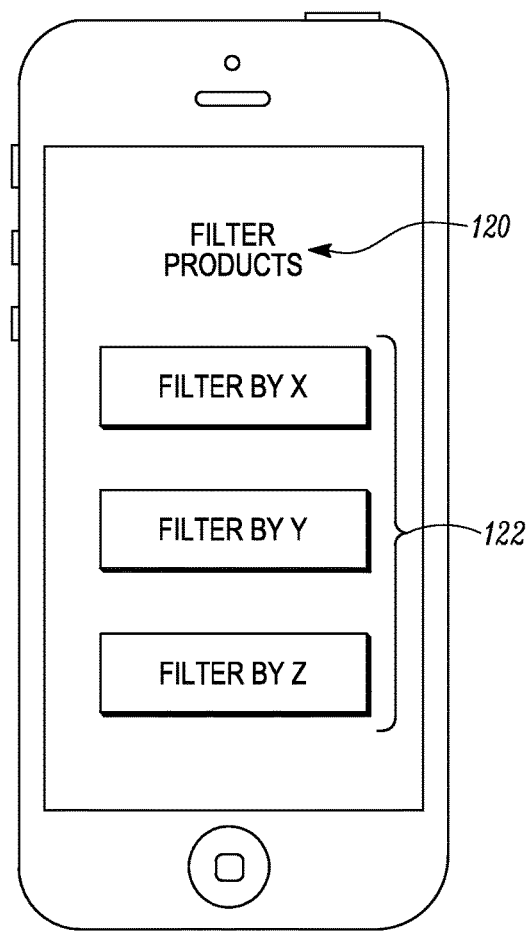
FIG. 11 is a schematic depiction of a screenshot of a display screen on the mobile device showing a product filtering option, according to an embodiment.

With reference to FIG. 11, another embodiment is illustrated. In this embodiment, the user is presented with a plurality of selectable filters each of which can be selected by the user to narrow the recognized products that are displayed. The filtering option can be presented to the user at any point in time prior to capturing the image, after capturing the image but before displaying the list 60, and/or after the list 60 is displayed. For example, the user can be prompted to select a product filtering option 120 from particular filters 122. The filters can be any filters that can aid in narrowing the list of recognized products from the advertisement. For example, and also referring to FIG. 7, if the user is only interested in the wall furnishings 86 appearing in the advertisement 80, a filter could be presented that, when selected by the user, results in only the wall furnishings appearing in the advertisement 80 being included in the list 60. Similar filters can be applied for any product category or type appearing in the advertisement including, but not limited to, furniture, accent pieces, clothing, floor coverings, and the like.

Figure 12:
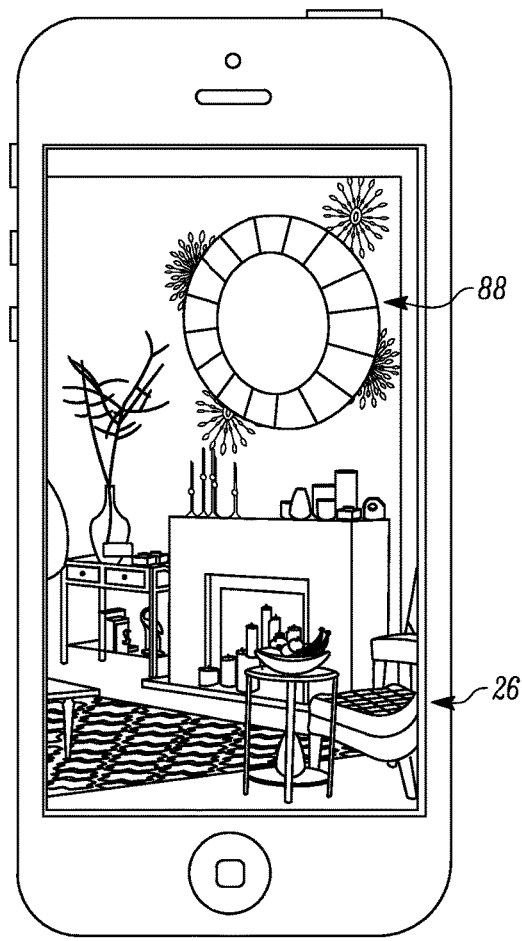
FIG. 12 is a schematic depiction of a screenshot of a display screen on the mobile device showing a pop-up feature during capturing an image of the advertisement, according to an embodiment.

With reference to FIG. 12, another embodiment is illustrated. In this embodiment, the application on the mobile device is configured such that as the camera of the mobile device is moved over the advertisement while capturing an image and an advertisement is recognized, a portion of the advertisement, or a product within a portion of the advertisement can temporarily pop-up/enlarge on the displayed user interface and then reduces back to regular size as the user moves the mobile device away out of a certain range of the portion of the advertisement and moves out of the field of view, or a range within the field of view, of the camera of the mobile device, or after a predetermined period of time elapses. For example, and also referring to FIG. 7, as the camera is moved over the portion of the advertisement including the mirror 88 appearing in the advertisement 80 and the portion of the advertisement including the mirror 88 is recognized during the image recognition, the portion of the advertisement that includes the mirror 88 that is displayed on the screen 26 temporarily enlarges in size (see FIG. 12) relative to other portions of the advertisement 80. FIG. 12 illustrates the portion of the advertisement including the mirror 88 displayed on the display screen with a larger size relative to other portions of the advertisement displayed on the display screen than what it normally would have if it were displayed regularly without this enlargement feature. As the camera is moved away and the portion of the advertisement moves out of the field of view of the camera, or after a predetermined period of time elapses, the portion of the advertisement including the mirror 88 returns back to normal size on the screen 26. In this embodiment, data is continuously sent to the image recognition module as the camera is moved over the advertisement so that image recognition occurs during imaging.

Figure 13:
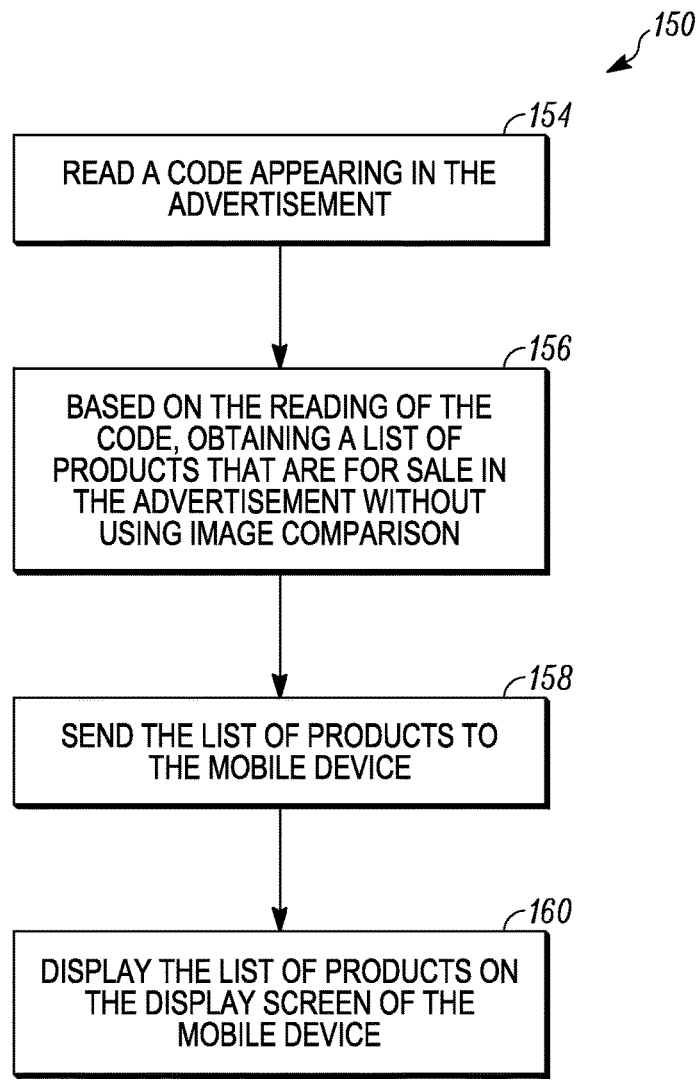
FIG. 13 illustrates a shopping method, according to another embodiment.

FIG. 13 illustrates a shopping method 150 according to another embodiment. In this embodiment, generation and display of the list of products appearing in the advertisement is achieved without using image comparison. Instead, a code appearing in the advertisement is read, which is then used to obtain a list of products that appear in the advertisement, with the list then being displayed on the display screen of the mobile device.

In the shopping method 150, a code 152 appearing in an advertisement, for example the advertisement 80 illustrated in FIG. 7, is read at step 154. As described above in the description of FIG. 7, the advertisement 80 displays a plurality of images of products that are for sale. The advertisement can be, for example, a one- or two-page advertisement such as a circular or magazine advertisement. The advertisement can be on any medium such as paper or in electronic form on a website.

With reference to FIG. 7, the code 152 can be any type of code that can be used to identify the advertisement 80 and thereby determine the products that are displayed in the advertisement 80. Examples of suitable codes include, but are not limited to, QR codes and a one-dimensional bar code. The code 152 can be visible to the naked eye as illustrated in FIG. 7 or non-visible to the naked eye. In addition, the code 152 can be located anywhere on the advertisement.

In one embodiment, the code 152 is read by using the camera of the mobile device to image the code 152 followed by subsequent recognition or interpretation of the code 152 using the mobile device application loaded on the mobile device. The technology for imaging a code and recognizing or interpreting the code is well known to those of ordinary skill in the art. In another embodiment, the code is imaged using the camera, but the image of the code is then sent from the phone to a remote location, for example to the server 30 in FIG. 2, for subsequent recognition or interpretation of the code at a location remote from the mobile device.

In step 156, based on the reading of the code 152 in step 154, a list of the products that are for sale in the advertisement 80 is obtained without using image comparison. In one embodiment, the code 152 can be unique to the advertisement 80 in which the code 152 appears, and the products that are displayed in the advertisement 80 can be assigned to that code 152. Each code 152, and its associated products displayed in the advertisement 80, can be stored in a database of codes 162 (illustrated in FIG. 2) that permits retrieval of the products assigned to each code 152 based on the code 152 that is read. For each code 152, the assigned products can be stored in the database in a list form, or the database can store the assigned products individually in which case the list of products needs to be generated by gathering all of the products assigned to the code that is read. The database of codes 162 can be part of or in communication with the server 30 in FIG. 2.

The code sent from the mobile device to the server, or recognized by the server, is used to access the database of codes 162 to determine which products are displayed in the advertisement 80 containing that code. The list of the products in the advertisement 80 is then obtained and the list of products is then sent to the mobile device in step 158. The list of products is then displayed on the display screen of the mobile device in step 160. In one embodiment, the list of products that is obtained, sent and displayed can be similar or identical to the list 60 described above with respect to FIG. 5.

Figure 14:
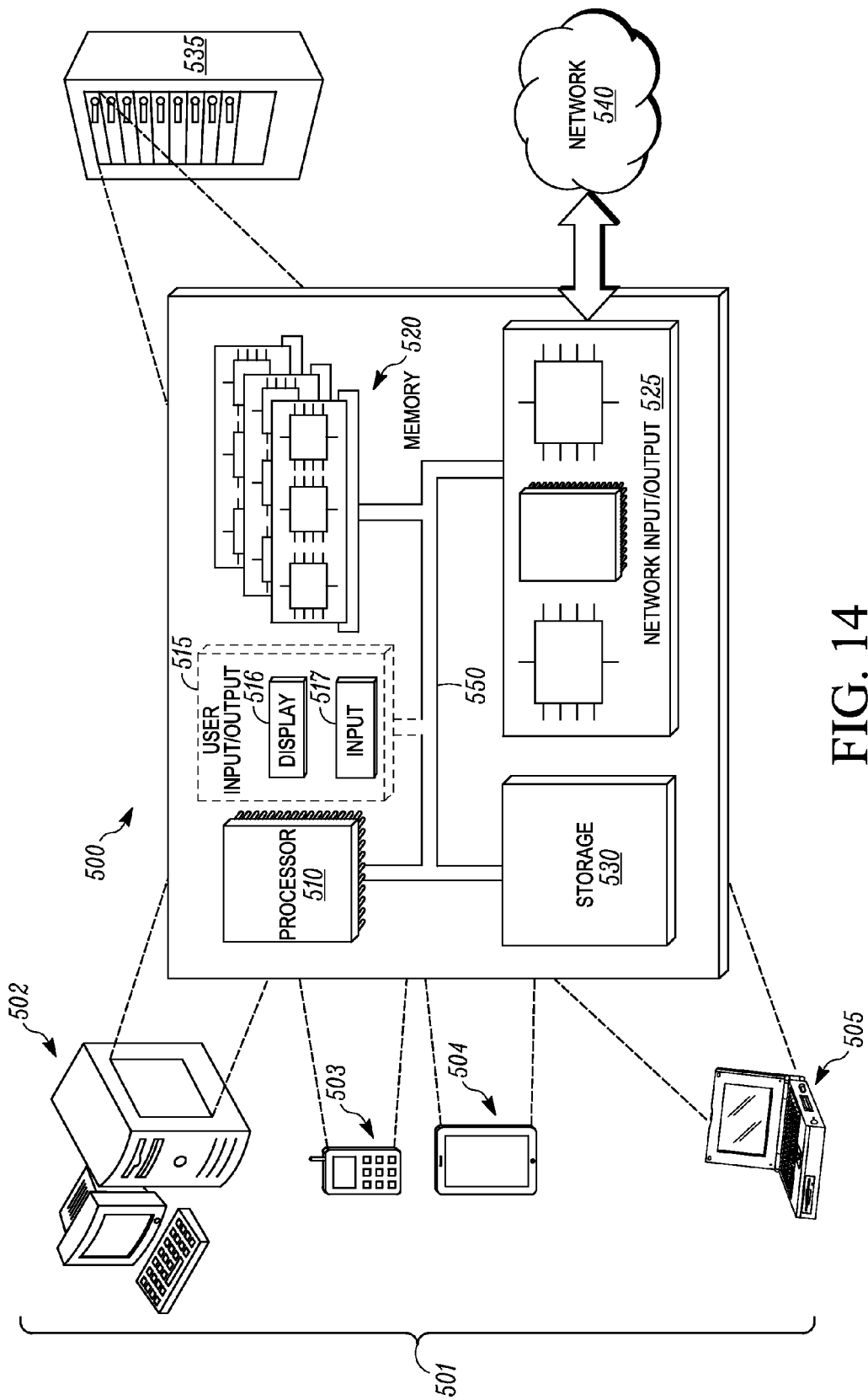
FIG. 14 is a schematic diagram of architecture of a computing device and computing system optionally used in connection with computer-implemented methods described herein, according to an embodiment.

FIG. 14 is a schematic diagram of an architecture for a computer device 500. The computer device 500 and any of the individual components thereof can be used for any of the operations described in accordance with any of the computer-implemented methods or systems described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples only and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like. Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A shopping method, comprising:
providing a mobile device application that a user can load onto a mobile device having a camera and a display screen, the mobile device application permitting the user to use the camera of the mobile device to view an image of an advertisement that includes a plurality of product images displayed therein, wherein the image of the advertisement contained within a field of view of the camera is displayed on the display screen, and the field of view of the display screen forms a captured image;
receiving the captured image from the mobile device, the captured image including the plurality of product images of the advertisement;
comparing the captured image to advertisement images stored in memory; based on the comparing:
automatically enlarging one of the plurality of product images displayed on the display screen relative to a size of other portions of the advertisement displayed on the display screen for a temporary period of time, the one of the plurality of product images enlarged while maintaining a position of the one of the plurality of product images within the advertisement;
automatically returning the one of the plurality of product images displayed on the display screen that is enlarged to an unenlarged size when the field of view of the camera changes so that the one of the plurality of product images displayed on the display screen no longer includes the one of the plurality of product images as enlarged; and
generating a list of recognized products, the list of recognized products being associated with the captured image determined to match the advertisement images stored in memory; and
sending the list of recognized products to the mobile device for display of the list of recognized products on the display screen of the mobile device without requiring the user to first view any advertisement or promotion.

2. The shopping method of claim 1, wherein the captured image is received by a server that is separate from the mobile device, and wherein the memory with the stored advertisement images is located at the server, and the comparing occurs at the server.

3. The shopping method of claim 1, wherein the list of recognized products that is displayed on the display screen includes an image of each recognized product, a brief description of each recognized product, and a price of each recognized product.

4. The shopping method of claim 3, further comprising displaying a select all button on the display screen, the select all button is configured such that when the select all button is selected by a user, all of the recognized products in the list are selected.

5. The shopping method of claim 3, further comprising displaying at least a portion of the captured image on the display screen along with the list.

6. The shopping method of claim 1, further comprising configuring the mobile device application so as to permit the user to select between displaying the list of recognized products or displaying each recognized product individually one-by-one.

7. The shopping method of claim 1, further comprising configuring the mobile device application so as to permit the user to filter the recognized products that are included in the list.

8. A server useable in a shopping system that includes a mobile device with image capture means configured to permit capturing an image of a designated advertisement that contains images of a plurality of products, the mobile device also includes display means, the server comprising a processor and a memory:

the processor receiving, from the mobile device, an image of the designated advertisement contained within a field of view of the image capture means of the mobile device, and comparing received images to stored advertisement images, in the memory, in order to identify the image and determine recognized products displayed in the image, the server configured to communicate with the mobile device to cause an automatic enlargement of a one of the plurality of product images contained within the field of view of the image capture means and displayed by the display means of the mobile device, the one of the plurality of product images enlarged while maintaining a position of the one of the plurality of product images within the advertisement, and to communicate with the mobile device to cause an automatic return of the one of the plurality of product images displayed on the display screen that is enlarged to an unenlarged size when the field of view of the camera changes so that the one of the plurality of product images displayed on the display screen no longer includes the one of the plurality of product images as enlarged;

the processor generating a display file, the display file includes images of the recognized products as determined, a description of each recognized product, and a price of each recognized product, and the display file is configured to permit display of the images of the recognized products in a vertically arranged list; and the server is configured to communicate with the mobile device to send the display file to the mobile device for display of contents of the display file on the display means.

9. The server of claim 8, wherein the display file that is generated is configured to cause a button to be displayed on the display screen, the button is configured to be selectable by a user when the contents of the display file are displayed on the display means, and when the button is selected all of the recognized products are selected for purchase by the user.

10. The server of claim 8, wherein the display file that is generated includes at least a portion of the image as received by the server from the mobile device.

11. The server of claim 8, wherein the server is configured to receive a user selection from the mobile device indicating a user selection between displaying the images of the recognized products in the vertically arranged list or displaying the image of each recognized product individually one-by-one.

12. The shopping system of claim 8, wherein the server is configured to receive a user selected filter category, and based on the received user selected filter category, the processor filters the display file to include only recognized products within the user selected filter category.

13. A system, comprising:

a mobile device application that is loadable onto a mobile device having a camera and a display screen, and that when loaded onto the mobile device permits the mobile device to capture an advertisement image using the camera, communicate with at least one server to send to the server a portion of the advertisement image contained within a field of view of the camera and to receive from the server recognized product data associated with the advertisement image, and to cause display of images of at least two recognized products on the display screen;

at least one server remote from the mobile device on which the mobile device application is loaded and that is able to communicate with the mobile device, the at least one server is configured to receive the portion of the advertisement image contained within the field of view of the camera from the mobile device, determine recognized products from the received portion of the advertisement image contained within the field of view of the camera, and send recognized product data to the mobile device application;

wherein the mobile device application is configured to cause an image of the advertisement that is contained within the field of view of the camera to be displayed on the display screen and to cause temporary enlargement of a one of the recognized products contained within the field of view of the camera relative to a size of other portions of the advertisement appearing in the advertisement image, the one of the recognized products enlarged while maintaining a position of the one of the recognized products within the advertisement, and to cause the one of the recognized products displayed on the display screen that is enlarged to return to an unenlarged size when the field of view of the camera changes so that the one of the recognized products displayed on the display screen no longer includes the one of the recognized products as enlarged, and wherein the recognized product data sent to the mobile device application causes display of at least two recognized products on the display screen in a visual arrangement that differs from a visual arrangement of the products in the advertisement.

14. The system of claim 13, further including a button displayed on the display screen along with the at least two recognized products, the button is configured to be selectable by a user when displayed, and when the button is selected all of the recognized products displayed on the display screen are selected for purchase by the user.

15. The system of claim 13, wherein the mobile device application is configured to permit selection between displaying the at least two recognized products or displaying each recognized product individually.

16. The system of claim 13, wherein the mobile device application is configured to permit a user to apply a filter so that only a selected category of recognized products is displayed on the display screen.

17. The shopping method of claim 1, wherein the advertisement includes an indicator feature that is not visible to a naked human eye, the indicator feature being used to at least one of track a number of times a particular product is selected from the list of recognized products, and track whether a product is purchased from the list of recognized products.

* * * * *